Nov. 13, 1928.   1,691,366
A. AMES, JR
IMAGE MODIFYING APPARATUS FOR PHOTOGRAPHY
Original Filed Jan. 17, 1920
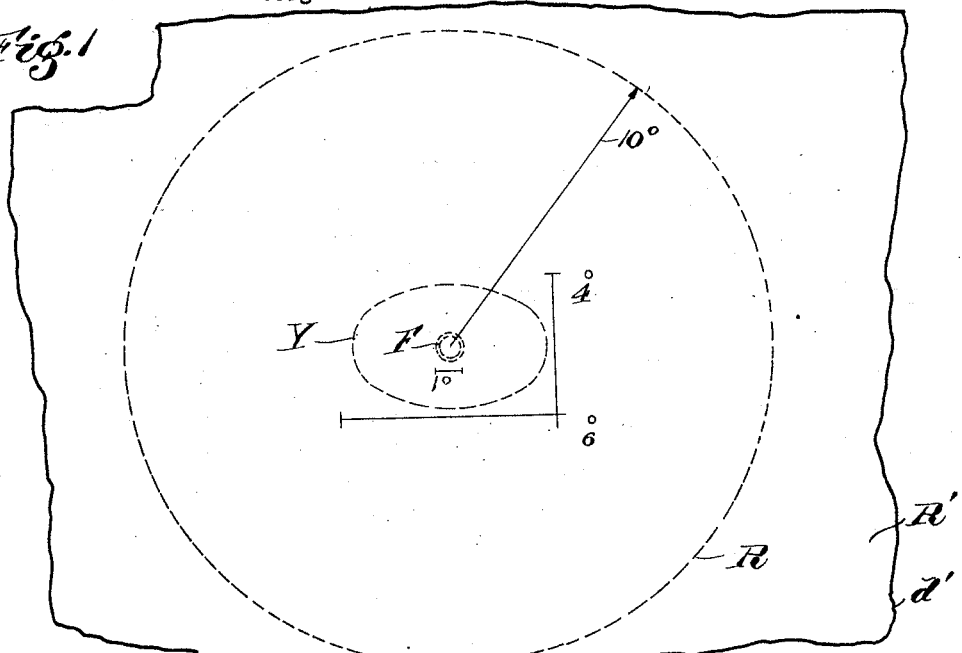
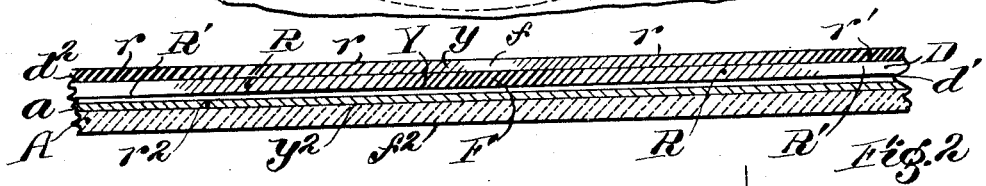
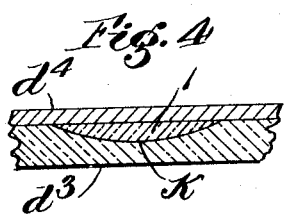
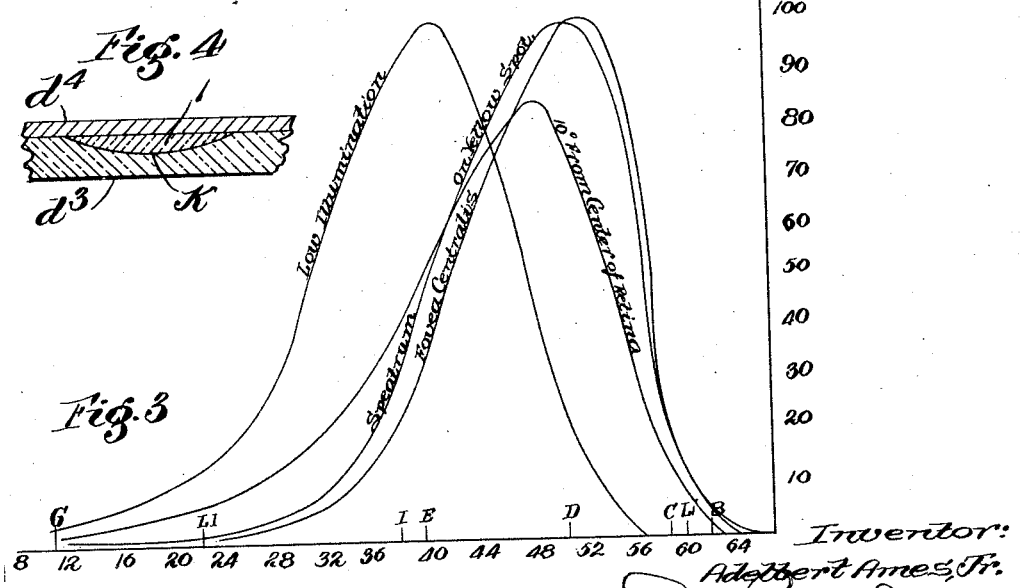
Inventor:
Adelbert Ames Jr.
by Roberts, Roberts & Cushman
his Attys.

Patented Nov. 13, 1928.

1,691,366

UNITED STATES PATENT OFFICE.

ADELBERT AMES, JR., OF HANOVER, NEW HAMPSHIRE.

IMAGE-MODIFYING APPARATUS FOR PHOTOGRAPHY.

Continuation of application Serial No 351,012, filed January 17, 1920. This application filed June 1, 1923. Serial No. 642,754.

This invention relates to apparatus for photography, and particularly to means adapted to modify the effect of the image on the sensitive surface.

Photography as heretofore carried out in a pictorial sense has aimed to present to perception a record of the natural things portrayed recognizable, with more or less aid by the imagination, as a reproduction of the objects depicted.

At best, photographs are limited to a partial presentation only of the factors or qualities giving distinguishing appearance to natural objects as viewed by the human eye. The natural objects are tri-dimensional, but the photograph must be viewed as a plane projection, either as thrown upon a screen, as a transparency seen against an illuminated background, or as an arrangement of light and dark places on a paper or other surface. The complete illusion of looking at the object pictured is not reached by any photograph because of the artificiality of the picture due to these reasons. Absence of color is of course also a factor in failure of illusion, but not the most important factor.

The present invention has to do with the simulation of the sensitiveness of the retinal surface of the eye, especially in respect to stimulation by color. Discovery by research shows a marked selective distribution of sensitivity to color of the human eye, and I shall herein describe contributions to the art for the purpose of causing photographic pictures to conform, whether monochromatic or polychromatic, to the appearance expected by the normal eye in respect to the value of representations of differently colored objects, especially in respect to the position of the object in the line of sight or center of interest, or elsewhere at an angle to this line of sight, in the object field.

One aspect of my invention is particularly applicable to the making of monochromatic component pictures for selective color by superposition of differently colored monochromes, thus making polychromatic photographs in the colors of nature. One object of the invention is to provide means for securing a variable sensitiveness of the plate with respect to a colored impression while maintaining uniformity or other predetermined distribution of degree of sensitiveness in a quantitative sense upon the plate in relation to its axial center and angular regions.

In the accompanying drawings:—

Figure 1 is a diagram in plan illustrating central areas of the completed photograph and of selective screens employed between the plate and the photographic lens;

Figure 2 is a section on any radius from the center of Fig. 1, illustrating a typical arrangement according to the invention;

Figure 3 is a diagram illustrating quantitatively the distribution of intensities of perception of light of different wave lengths or colors in respect to the retina of the normal eye, and also showing the distribution of intensities of perception at low illuminations; and Figure 4 is a section similar to Figure 2 illustrating a modified form of the device of the invention.

Referring to the drawings, photographs made with the aid of the apparatus are positive or negative projections, transparencies or prints produced by any preferred process from a negative A, Fig. 2, which may comprise any preferred sensitive emulsion coating $a$ on any kind of backing $b$ such as the flat glass plate indicated, when suitably exposed and developed.

For the particular purposes of this invention, the coating $a$ should approach the color sensitivity of the eye, so far as average relative degree of chemical sensitiveness to light of different wave-lengths is concerned. A commercial panchromatic plate having sensitiveness in the yellow light near the sodium D lines, an infra-red limit at about the A lines, and low sensitiveness to wave lengths shorter than the G lines, is satisfactory for the purpose intended. The well-known Wratten panchromatic plate, for instance, is a suitable plate.

If such a plate is exposed in the image plane of a photographic lens system (preferably a lens system having the aberrations, diffusions and distortions characteristic of the human eye), its reaction to the luminous intensities of the image will be uniform throughout the exposed surface of the plate. Illusive photography requires the impression upon the plate of certain diffusions, aberrations and distortions; in these respects the plate A alone satisfactorily records the image.

But for color photography, or for monochromatic photographic expression of panchromatic values improving the monochromatic picture, I prefer also to distribute the panchromatic sensitivity of the plate or other image receiving surface according to the similar distribution of sensitivity in the retina of the normal human eye. For clear explanation it is necessary to understand certain peculiarities of the eye with respect to perception of color.

Referring now to Figs. 1 and 3, the clearest seeing part of the retina, the fovea centralis, is concentrated on a surface about one degree of arc wide, situated nearly centrally of the so called "yellow spot," having an oval area about 6 degrees wide in a horizontal direction, and about 4 degrees wide in a vertical direction, and these areas of the retina are about centrally situated in a region of sensitiveness substantially 40 degrees, more or less, wide (all as measured from the nodal point of the ocular lens), of less sensitivity than the yellow spot. The outside part of the last mentioned region is sensitive in lessened degrees to something beyond 40 degrees of the visual angle. These different regions of the eye vary substantially in respect to their power of excitation by light of different colors. The result of a careful series of measurements in these particulars is plotted in Fig. 3.

In this figure the various traces show by their ordinates percentages of intensity of visual perception of the bright continuous spectrum from the cathode crater of a carbon arc light at respective regions of the retina, the wave-lengths being indicated according to an arbitrary scale by the abscissæ. The following table of mean readings of these quantities by observation of a number of individual and normal eyes gives the data which the figure graphically shows:

| 1 | 2 | 3 | 4 | 5 |
|---|---|---|---|---|
| Scale number | Wave length | Outside yellow spot | Yellow spot | Fovea centralis |
| 64 | 7217 | | | |
| 63 | 7082 | | 1 | |
| 62 | 6957 | 1 | 2 | 2 |
| 61 | 6829 | 2 | 4 | 4 |
| 60 | 6728 | 3.5 | 7 | 8 |
| 59 | 6621 | 7.5 | 12.5 | 15.5 |
| 58 | 6520 | 12.5 | 21 | 24 |
| 57 | 6423 | 19 | 33 | 37.5 |
| 56 | 6330 | 27.5 | 50 | 60 |
| 55 | 6242 | 35 | 65 | 77 |
| 54 | 6152 | 43 | 80 | 90 |
| 53 | 6074 | 52.5 | 90 | 97 |
| 52 | 5996 | 61 | 96 | 100 |
| 51 | 5919 | 71 | 99 | 100 |
| 50 | 5850 | 79 | 100 | 98 |
| 49 | 5773 | 84 | 99 | 95 |
| 48 | 5720 | 85 | 97 | 90 |
| 47 | 5658 | 83.5 | 92.5 | 85 |
| 46 | 5596 | 81 | 87 | 79 |
| 45 | 5538 | 77 | 81 | 72.5 |
| 44 | 5481 | 72.5 | 75 | 66 |
| 43 | 5427 | 68 | 69 | 59 |
| 42 | 5373 | 62.5 | 62.5 | 51 |
| 41 | 5321 | 57 | 57 | 45 |
| 40 | 5270 | 52 | 50 | 40 |
| 39 | 5221 | 46 | 42.5 | 32 |
| 38 | 5172 | 41.5 | 36 | 27.5 |
| 37 | 5128 | 37.5 | 29.5 | 22 |
| 36 | 5085 | 33.5 | 24 | 18 |
| 35 | 5043 | 30 | 18.2 | 14 |
| 34 | 5002 | 26.5 | 14.2 | 10 |
| 33 | 4963 | 24 | 10.5 | 8.4 |
| 32 | 4924 | 21 | 8.5 | 6.5 |
| 31 | 4885 | 18.5 | 7 | 5.5 |
| 30 | 4848 | 16.5 | 5.5 | 4 |
| 29 | 4812 | 14.5 | 4.7 | 3.5 |
| 28 | 4776 | 13 | 4 | 3 |
| 27 | 4742 | 11.5 | 3.5 | 2 |
| 26 | 4707 | 10.5 | 2.8 | 2.4 |
| 25 | 4675 | 9.4 | 2.3 | 2.1 |
| 24 | 4639 | 8.2 | 1.82 | 1.9 |
| 23 | 4608 | 7.3 | 1.6 | 1.5 |
| 22 | 4578 | 6.3 | 1.4 | |
| 21 | 4548 | 5.7 | 1.2 | |
| 20 | 4517 | 5 | 1.08 | |
| 19 | 4488 | 4.5 | .94 | 1 |
| 18 | 4459 | 4 | .86 | |
| 17 | 4437 | 3.6 | .78 | |
| 16 | 4404 | 3.1 | .70 | |
| 15 | 4377 | 2.7 | .62 | .62 |
| 14 | 4349 | 2.3 | .56 | |
| 13 | 4323 | 2.1 | .50 | |
| 12 | 4296 | 1.9 | .45 | |
| 11 | 4271 | 1.65 | .40 | |
| 10 | 4245 | 1.4 | .34 | |
| 9 | 4221 | 1.2 | .30 | |
| 8 | 4197 | 1 | .26 | |
| 7 | 4174 | .88 | .22 | |
| 6 | 4151 | .75 | .18 | |
| 5 | 4131 | .63 | .16 | |
| 4 | 4106 | .50 | .14 | |

It will be observed that the maximum intensity at the fovea centralis is in the yellow light between wave-lengths $\lambda=5919\mu$ and $\lambda=5996\mu$; that the equivalent maximum for the yellow spot is at $\lambda=5850\mu$ and that the visual intensity of the same light on the surrounding region 10° from the fovea is only about 85% of that for the fovea and yellow spot and maximum at about $\lambda=5720\mu$; but that this region exceeds the yellow spot and fovea in sensitiveness to the greens and blues extending from $\lambda=5270\mu$ to the ultra-violet visual limit.

If these values are determined in low illuminations, the normal eye undergoes not only pupillary expansion, but also changes its selective color sensitivity. The same spectrum when reduced in intensity to the photometric value at the D lines of 1/132.5 of the illumination by a standard amyl lamp at a distance of one foot affects the retina according to the following table:

| Scale number | Wave length | Mean reading reduced to 100 maximum |
|---|---|---|
| 56 | 6330 | 5.4 |
| 54 | 6152 | 5 |
| 52 | 5996 | 13 |
| 50 | 5850 | 24 |
| 48 | 5720 | 42 |
| 46 | 5596 | 66 |
| 44 | 5481 | 84 |
| 42 | 5373 | 95 |
| 40 | 5270 | 100 |
| 38 | 5172 | 94 |
| 36 | 5085 | 84 |
| 34 | 5002 | 72 |
| 32 | 4924 | 58 |
| 30 | 4848 | 45 |
| 28 | 4776 | 32 |
| 26 | 4707 | 23 |
| 24 | 4639 | 17.5 |
| 22 | 4578 | 14 |
| 20 | 4517 | 11 |
| 14 | 4349 | 5 |
| 10 | 4245 | 2.5 |

The maximum perceptive intensity under these circumstances shifts into the green at about $\lambda = 5270\mu$, the perception of longer wave-lengths being markedly inhibited and of shorter wave-lengths markedly increased.

It will now be apparent that an illusive photograph giving either a correct monochromatic translation of panchromatic values, or comprising a polychromatic composite of monochrome elements, should faithfully record the different values of the image perceived at the center of interest (by the fovea) at the region near by (by the yellow spot) and at the outlying parts of the visual angle (by the remainder of the retina).

Whatever the photographic means employed, a plate uniformly sensitive to color and uniformly exposed to the image in a camera can not comply with these conditions. This invention therefore comprises a genus of new devices enabling the plate to record variably in a chromatic sense the image at the center of interest and the image at different angles of departure from the line of sight connoted by this center.

A preferred instance will now be described in connection with Figs. 1 and 2.

Let it be assumed that the photograph is to be made at an image plane corresponding to a known visual angle. This will be true for any constant arrangement of lenses, such as the lens-system described and claimed in my Letters Patent No. 1,482,502, dated February 5, 1924. Different areas of a sensitive plate exposed in such an image plane will therefore correspond to the respective retinal surfaces of the eye.

Provision is now made for maximum chromatic sensitiveness of the plate at a maximum corresponding to the chromatic maximum of the fovea centralis in a region near the optical axis of the camera lens, for instance at $f^2$, for decreased chromatic sensitiveness at the immediately surrounding region $y^2$, and for further decreased sensitiveness to the maximum lumniosity color and relatively increased sensitiveness to shorter wave lengths in a surrounding zone $r^2$, and finally the remainder of the plate is rendered insensitive to all except the shorter wave-lengths for the remainder of its surface.

These qualities may be imparted to the plate by suitable local treatment of the emulsion, but a preferred expedient is to influence the color of the image incident upon the plate with the aid of a suitable absorption screen D. This screen should be so devised as to impose no quantitative absorption, its function being to influence the color only of the light transmitted thereby without alteration of the uniformity of distribution in a quantitative sense of the light incident upon it. Figs. 1 and 2 illustrate a preferred construction for this purpose. The screen is in two parts, a colored plate $d'$ and a corrector plate $d^2$, preferably of a colorless but variable transparency.

As suggested above, the commercial panchromatic or orthochromatic plate is capable of sufficient accuracy of maximum color sensitiveness at the right part of the spectrum, but in practice this is usually attained with the aid of a color filter or absorption screen, which is generally arranged to exclude some of the light of shorter wave length, in aid of the selective chemical treatment of the film surface $a$, the absorption screen generally having the powers of transmission equivalent to a thin film of sodium bichromate or some other yellow dye or stain. The new screen $d'$ is of this nature at the region F, preferably a circular region subtending about one degree of arc with respect to the nodal point of the lens. The part of the plate $f^2$ under this spot will then have a sensitiveness corresponding to the sensitiveness of the fovea.

The screen $d'$ is also provided with a region Y preferably an oval about six degrees long and about four degrees wide with respect to the nodal point. This region is colored with an attenuated dye or pigment permitting more of the shorter wave length light to pass. The surrounding, preferably circular region R of the absorption screen is colored with a still more attenuated dye. The remainder R' of the absorption screen may be transparent and uncolored.

It will be observed that the selective absorption of the absorption screen $d'$ is distributed as it is in the normal human eye, but if such a screen $d'$ were interposed alone between the plate and the lens, a substantial part of the quantity of light incident on the plate would be cut off by the regions F, Y, R, of the screen, whereas the illumination of the plate should be uniform so far as the function of the absorption screen is concerned.

This is provided for by superposing upon the absorption screen $d'$ the corrector screen $d^2$, which may or may not be colored to influence the color of the light transmitted. For use with such plates as those mentioned, preferably the corrector screen is colored with a neutral pigment. Its central region $f$ corresponding to the spot F may be quite transparent; the surrounding region $y$ corresponding to the spot Y is lightly tinted the larger circular region $r$ corresponding to the region R is more heavily tinted, and the remainder of the surface $r'$ is still more deeply tinted.

The mutual arrangement of the screens $d'$ and $d^2$ is such as to cause quantitative uniformity of transmission of light through them when they are superposed. Such screens may be made of any suitable material and by any suitable process. They may be made of glass suitably pigmented; or they may be made of clear glass having a suitable pigmented coating; or they may comprise clear glass enclosing films of gelatine or other transparent colloidal substance locally dyed or pigmented as described.

Whatever the detail of the material employed the distribution of the pigment or coloring of the selective screen should substantially correspond in effect upon the transmitted light to the variable sensibility of the corresponding regions of the retina as explained above.

When it is desired that the photograph shall aid the impression of low illumination, the device and method of this application may be employed without change except the substitution for the screen $d'$ of a screen of another color more absorbent of the red end of the spectrum and less absorbent of the blue end. The effect may be still further enhanced by making the screens for low illumination with less absorptive difference between the central spot and the yellow spot region Y and the surrounding area R, and the difference between the region R and the region R′ may be still less in degree. The neutral corrector is correspondingly altered. In general, the photometric density of the various regions of screens may vary among themselves in proportion to the areas of the appropriate curves shown in Fig. 2.

It will be understood that the margins or boundaries between the differently tinted areas of the components of the absorption screen should not be sharp or hard lines; these regions merge one into the other with a gradual diffusion, the complemental parts of the plates being so merged or diffused in an opposite sense as to maintain uniformity of photometric value of the superposed components throughout.

One construction of screen is illustrated in Fig. 4, in which the plate $d^3$ is formed with a central meniscus or countersink $k$ which may be of size corresponding to the area F and circular in outline, or of size and shape corresponding to the area Y, or have other suitable shape and size variations interrelated with and complementary to those of the plate $d^3$. A cover plate $d^4$ may be employed which, if desired, or necessary, may be varied to compensate for variations in the absorption of plate $d^3$ but preferably is uniformly transparent.

The countersink $k$ is filled with a transparent colored substance having the essential actinic properties to produce the intended result. For example, I may fill the countersink with a button or disc 1 ground from yellow or other glass selectively absorbent as respects the short wave length end of the spectrum and of substantially the same index of refraction as plate $d^3$, or with Canada balsam or other transparent gum or liquid of substantially the same index of refraction as the plate $d^3$ and having the proper transmission and absorption properties imparted thereto as by staining or commingling absorption elements therewith may be used. The button $l$ may or may not entirely fill and fit the countersink, and in the latter case Canada balsam or other optical cement may be relied upon to fill up the intervals, unite the parts, and prevent internal refraction or reflecting surfaces.

The countersink $k$ variably reduces the absorbent effect of the plate $d^3$, and the filling of the countersink substitutes the effect of the filler $l$ in gradually varying intensity from center to edge, the color of the filler, for example, being pronounced at the central portion of the countersink and growing progressively less toward the edge where the color of the filling is negligible in relation to the color of the plate $d^3$.

A preferred way of uniting the button $l$ and plate $d^3$ is by fusion, the parts being subsequently surfaced. When so joined, there is no visible edge or line of joinder between the parts which might deflect or diffuse impinging light, and the quantitative transmission of white light is uniform throughout the screen.

I claim:

1. An absorption screen for use in photography comprising a color absorption element arranged selectively to absorb more light of the same color at one part of the image than at another part of the image, and a corrector element adapted and arranged to absorb a compensating amount of the light transmitted by the respective parts of the absorption screen.

2. An absorption screen for use in photography having a color absorption element variable from a central region of the screen toward its periphery, and a corrector element adapted and arranged for colorless absorption of an inversely varying amount of the incident light.

3. A color screen for photography having a color-absorbing substance arranged thereon in substantially the relative positions and areas of the fovea and yellow spot in the normal human eye.

4. An absorption screen for use in photography having different powers of absorption of light of different colors in different portions, and having therein means for compensating for different quantitative transmission of white light on said portions, whereby transmitted illumination throughout the screen is substantially uniform.

5. An absorption screen for use in photography including a member having different powers of absorption for light predominantly of one color in different areas, and a corrector member having inversely arranged monochrome absorption areas compensating for value only of the transmitted light.

6. A composite absorption screen for use in photography having the property of substantially uniform quantitative transmission of light, and comprising an absorbent component having areas varying in the property of transmission of selected light waves.

7. A screen for use in photography adapted for uniform transmissions of the same quantity of light throughout its area and having an element adapted to cause selective color absorption progressively varying along any radius of the screen from a central region.

8. A screen for use in photography comprising overlaid members, one having a selective light absorbing portion laterally varying in selective absorbent effect, and the other having a portion laterally varying in absorbent effect in an inverse sense, whereby in use not to impose any variation in value as distinguished from color of the transmitted image.

Signed by me at Hanover, N. H., this 28th day of May, 1923.

ADELBERT AMES, Jr.